United States Patent
Hardy et al.

(10) Patent No.: US 11,292,463 B2
(45) Date of Patent: Apr. 5, 2022

(54) DETERMINATION OF A CONTROL SIGNAL FOR AN IN-PART-AUTONOMOUS VEHICLE

(71) Applicant: Robert Bosch GmbH, Stuttgart (DE)

(72) Inventors: Jason Scott Hardy, Union City, CA (US); Joerg Mueller, Mountain View, CA (US); Oliver F. Schwindt, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 269 days.

(21) Appl. No.: 16/566,662

(22) Filed: Sep. 10, 2019

(65) Prior Publication Data

US 2020/0094822 A1    Mar. 26, 2020

(30) Foreign Application Priority Data

Sep. 26, 2018   (DE) ................. 10 2018 216 423.1

(51) Int. Cl.
| | |
|---|---|
| *B60W 30/095* | (2012.01) |
| *G08G 1/16* | (2006.01) |
| *G06K 9/00* | (2006.01) |
| *B60W 30/09* | (2012.01) |
| *B60W 50/00* | (2006.01) |

(52) U.S. Cl.
CPC ........ *B60W 30/0956* (2013.01); *B60W 30/09* (2013.01); *B60W 50/0097* (2013.01); *G06K 9/00805* (2013.01); *G08G 1/16* (2013.01); *B60W 2420/42* (2013.01); *B60W 2420/52* (2013.01); *B60W 2420/54* (2013.01); *B60W 2710/18* (2013.01)

(58) Field of Classification Search
None
See application file for complete search history.

(56) References Cited

U.S. PATENT DOCUMENTS

| | | | |
|---|---|---|---|
| 9,645,577 B1* | 5/2017 | Frazzoli | B60W 30/0956 |
| 10,126,136 B2* | 11/2018 | Iagnemma | G05D 1/0088 |
| 10,281,920 B2* | 5/2019 | Frazzoli | B60W 10/184 |
| 2016/0327953 A1* | 11/2016 | Nilsson | B60W 30/16 |
| 2017/0291608 A1* | 10/2017 | Engel | G08G 1/096741 |
| 2017/0336788 A1* | 11/2017 | Iagnemma | G05D 1/0246 |
| 2017/0341652 A1* | 11/2017 | Sugawara | B60W 30/12 |
| 2018/0114442 A1* | 4/2018 | Minemura | B60T 8/17558 |

* cited by examiner

*Primary Examiner* — Navid Ziaeianmehdizadeh
(74) *Attorney, Agent, or Firm* — Maginot, Moore & Beck LLP

(57) ABSTRACT

A system for a vehicle, which drives in an at least in-part-automated manner is configured to determine a control signal for a control system. The system includes a sensor, a planning module, and a monitoring module. The sensor is configured to detect an object in a surrounding area of the vehicle and store a corresponding object representation. The planning module is configured to determine, based to the stored object representation, a first trajectory and a first probability of collision of the first trajectory for the vehicle. The monitoring module is configured to perform one of following actions when the first probability of collision exceeds a predefined probability of collision: determine, using the planning module and based on the stored object representation, a further trajectory having a further probability of collision and a maximum deceleration of the further trajectory; or assess the stored object representation of the object using the sensor.

14 Claims, 3 Drawing Sheets

DETERMINATION OF A CONTROL SIGNAL FOR AN IN-PART-AUTONOMOUS VEHICLE

This application claims priority under 35 U.S.C. § 119 to patent application no. DE 102018216423.1 filed on Sep. 26, 2018 in Germany, the disclosure of which is incorporated herein by reference in its entirety.

The disclosure relates to the determination of a control signal for a vehicle, for example an in part autonomous or fully autonomous vehicle. In particular, the disclosure relates to a system and a method for a vehicle, which drives in an at least in part automated manner, for determining a control datum for a control system, a method, a program element and a storage medium. The control signal may be used by way of example in order to control the vehicle, wherein the vehicle is controlled at least temporarily using an assistance system and the vehicle is in particular part-automated, highly automated or fully automated.

BACKGROUND

In vehicles having assistance systems it is possible that this vehicle—for example in order to avoid a collision—may be intensely braked, accelerated or steered by means of the assistance systems. In some cases, there may be occasions where the estimated objects with which the vehicle is threatening to collide do not exist in the real world but rather are sensor-generated representations of incorrectly detected objects; these object representations are occasionally referred to as "artifacts" or "ghosts". These effects may lead to a reduction in safety and/or comfort.

SUMMARY

The object of the disclosure is to at least in part improve these disadvantages. This object is achieved by means of the subject matter of the disclosure. Further developments of the disclosure are apparent in the disclosure, the following description and the figures.

One aspect of the disclosure relates to a system for a vehicle, which drives in an at least in part automated manner, for determining a control signal for a control system, said system comprising a sensor that is configured so as to detect an object in a surrounding area and store said object as an object representation in a storage device, a planning module that is configured so as to determine in reaction to the object representation a first trajectory and a first probability of collision of the first trajectory for the vehicle. Furthermore, the system comprises a monitoring module that is configured so as to perform one of the following actions if the first probability of collision exceeds a predefined probability of collision: determine by means of the planning module in reaction to the object representation a further trajectory having a further probability of collision and a maximum deceleration of the further trajectory, or check the object representation of the object by means of the sensor.

A control signal is used for the purpose of controlling a control system for a vehicle in other words by way of example to influence the brake system, the drive train or the steering. The vehicle is by way of example a motor vehicle such as a car, a bus or a truck. The control signal for a specific situation is derived for example from calculated trajectories; this may—as an example for an arbitrary point in time arbitrary or for an arbitrary specific situation—mean the following instruction: "prevailing torque=75 Nm; prevailing steering position=1.5° to the right-hand side; prevailing braking force=0". In order to calculate a trajectory,—in addition to other data such as for example a definition of destination—a sensor is required that is configured so as to detect an object in a surrounding area, in other words an object in the real world such as a house, road, a person or a vehicle. The sensor may comprise one or multiple individual sensors, the sensor may also comprise a subsystem that combines the data of multiple sensors and/or multiple sensor types (for example camera and radar) and provides the data to the system as a combined representation. The object that is detected by means of the sensor is stored in the system as an object representation in a storage device, by way of example in the form of a geometric description or as an attributed object. In at least some cases it may be that the object that is detected by means of the sensor is a "ghost", in other words does not exist in the real world but is stored in the storage device as an object representation.

Furthermore, the system comprises a planning module that is configured so as to determine in reaction to the object representation a first trajectory and a first probability of collision of the first trajectory for the vehicle. The first trajectory may describe by way of example traveling the next 5 m straight ahead at a constant speed. The first trajectory may be derived for example from the definition of destination using a navigation system, together with the data from the sensor. Moreover, the planning module determines a probability of collision for the first trajectory. The probability of collision may also be a risk of collision, in other words the evaluation (for example by multiplication) of the probability of collision with the potential damage. Hereafter, the word "probability of collision" includes the meaning "risk of collision". In a specific embodiment, it is possible to switch between these calculating alternatives.

The probability of collision may be derived for example from the object representations of the objects, by way of example using a prediction module. A simple prediction module may for example extend the movement of all objects, for which there is an object representation, in a linear manner for example for a period of time in which the vehicle covers 5 m. It is then possible to determine cases in which the predicted path of one or multiple objects intersects with the path that the vehicle takes in accordance with the first trajectory, in other words in which a collision potentially takes place. The potential collisions of the first trajectory are combined in the probability of collision for the first trajectory. In many situations, the probability of collision may be zero.

Moreover, the system comprises a monitoring module that is configured so as to perform a predefined action when a predefined probability of collision is exceeded. As a first alternative, the action includes determining by means of the planning module in reaction to the object representation a further trajectory having a further probability of collision and a maximum deceleration of the further trajectory. If for example a collision is predicted with an object that is coming from the right-hand side, the further trajectory may thus include a slight deviation toward the left-hand side. As a consequence, by way of example the probability of collision may decrease to zero. If this is the case, this trajectory is then selected and the control signal for the control system is derived from this further trajectory. An actual collision may therefore be prevented in an efficient manner.

If multiple further trajectories are calculated that lead to an identical or particularly similar probability of collision, then the trajectory that comprises the smallest maximum deceleration is selected. This increases the safety and comfort of the vehicle because—as much as possible—sudden emergency braking procedures become considerably less frequent.

As a second alternative, the action comprises checking the object representation of the object by means of the sensor. It is indeed possible, at least in some cases, that the object that is detected by means of the sensor is a "ghost", in other words does not exist in the real world but is stored in the storage device as an object representation. If there is no risk of collision with such a "ghost" object, then such objects are not disruptive; a checking procedure in this case—at least in some constellations—is superfluous. For safety reasons, a "false negative object" is also perceived by the sensor to be more critical than a "false positive object" in other words a real object that is possibly overlooked. For the case of a potential collision, it is expedient to check the object of the potential collision and only to permit objects that are verified in this manner to be used for determining a reaction to the potential collision.

The system has the advantage that no limitations are required during the collision monitoring procedure and the collision reaction. Moreover, the collision reactions are moderate and close to an ideal human collision reaction. Furthermore, a high computing power is only then required if the collision monitoring procedure would also have been judged as difficult for human intuition.

In one embodiment, the sensor is a camera, a plurality of cameras, a radar sensor, a LiDAR sensor, an ultrasonic sensor or a subsystem that provides a merged view from at least two of the mentioned sensors. The sensor may thus comprise one or multiple individual sensors, the sensor may also comprise a subsystem that combines the data of multiple sensors and/or multiple sensor types such as for example camera and radar) and provides the data as a combined representation to the system.

In one embodiment, the object representation is a verified object representation or a non-verified object representation. In the case of the verified object representation, the object is detected at least one further time by the sensor or by another sensor and/or by another sensor type prior to being used by the system. As a result, for example some transient errors may be ruled out. In one embodiment, the object representations are checked multiple times, for example by means of checking by means of a sensor history, for example a camera history or also the history of merged objects. The non-verified object representation is conversely an object representation that is not checked a further time by the sensor (or sensor system).

In one embodiment, the monitoring module is configured so as to perform actions in accordance with the following rules if the first probability of collision exceeds a predefined probability of collision:
a) use the second trajectory in lieu of the first trajectory if the second probability of collision of the second trajectory is judged as acceptable by the monitoring module.
b) use a third trajectory having a third predefined probability of collision if the second probability of collision of the second trajectory is judged as unacceptable by the monitoring module, wherein the third trajectory uses only the verified object representation of the object.
c) determine a fourth trajectory having a fourth probability of collision and select the lower probability of collision from the third probability of collision and the fourth probability of collision if the third probability of collision of the third trajectory is judged as unacceptable by the monitoring module.
d) select the probability of collision having the lowest braking deceleration if the third probability of collision and the fourth probability of collision are approximately identical.

In accordance with the rule a) in other words initially a second trajectory is calculated together with a second probability of collision. If the second probability of collision is judged as acceptable by the monitoring module—for example if the second probability of collision is equal to zero —, then this trajectory is selected and the control signal for the control system is derived from this second trajectory. An actual collision may therefore be prevented in an efficient manner.

In order to apply the rule b) the second probability of collision is judged as unacceptable by the monitoring module. That may be the case by way of example if by performing the evasive maneuver (the second trajectory) the vehicle were to move over onto an oncoming lane on which many other vehicles are moving. In this case, the monitoring module checks the object representation of the object of the potential collision. The third trajectory uses only the verified object representation of the object. The potential collision may disappear by means of the checking procedure, in particular in the event that the object representation was a "ghost". In other words, an inappropriately intense reaction owing to a "ghost" object is prevented by means of this rule. If the object of the potential collision is a real object (in other words if the object representation corresponds to an object in the real world), then the third trajectory may be identical to the second trajectory.

If in accordance with rule c) the third trajectory that has been determined using a verified object representation of the object is judged as unacceptable, a fourth trajectory having a fourth probability of collision is determined. If the two trajectories (the third and the fourth trajectory) and the two probabilities of collision are provided, then the trajectory having the lowest probability of collision is used. The procedure for determining an alternative trajectory is relatively CPU-intensive with the result that this is only necessary in specific cases, for example in cases such as are defined by means of the rule c).

If in accordance with rule d) the two probabilities of collision (in other words the probabilities of collision of the third and the fourth trajectory) are approximately identical, then the trajectory having the lower maximum braking deceleration is selected. This increases the safety and comfort of the vehicle because as a consequence as much as possible sudden emergency braking procedures become considerably less frequent.

Altogether, in other words this hierarchical or cascading rule system leads to expedient reactions, to an efficient use of the computing power and therefore to rapid reactions and also to understandable behavior of the system and lastly therefore of the vehicle.

A further aspect of the disclosure relates to a vehicle having a system as described above.

A further aspect of the disclosure relates to a method for determining a control signal for a control system for a vehicle, which drives in an at least in part automated manner, by means of a system according to the disclosure, having the steps:
  detecting an object in a surrounding area and storing the object as an object representation in a storage device;
  determining by means of a planning module in reaction to the object representation a first trajectory and a first probability of collision of the first trajectory for the vehicle, performing one of the following actions by means of a monitoring module if a predefined probability of collision is exceeded:

determining by means of the planning module in reaction to the object representation a further trajectory having a further probability of collision and a maximum deceleration of the further trajectory, or checking the object representation of the object by means of the sensor.

In one embodiment, the mentioned method is refined by means of the monitoring module using the following rule:
a) use the second trajectory in lieu of the first trajectory if the probability of collision of the second trajectory is judged as acceptable by the monitoring module.

In one embodiment, the method furthermore comprises the following rule:
b) use a third trajectory having a third predefined probability of collision and a third maximum deceleration if the second probability of collision of the second trajectory is judged as unacceptable by the monitoring module, wherein the third trajectory only uses the verified object representation of the object.

In one embodiment, the method furthermore comprises the following rule:
c) determine a fourth trajectory having a fourth probability of collision and a fourth maximum deceleration and select the lower probability of collision from the third probability of collision and the fourth probability of collision if the third probability of collision of the third trajectory is judged as unacceptable by the monitoring module.

In one embodiment, the method furthermore comprises the following rule:
d) select the probability of collision having the lower braking deceleration if the third probability of collision and the fourth probability of collision are approximately identical.

A further aspect of the disclosure relates to a program element which if executed on a processing unit is configured so as to implement one of the mentioned methods.

A further aspect of the disclosure relates to a computer readable medium on which the mentioned program element is stored.

Further measures that improve the disclosure are further represented below together with the description of the preferred exemplary embodiments of the disclosure with the aid of figures.

DETAILED DESCRIPTION

Figure 1:
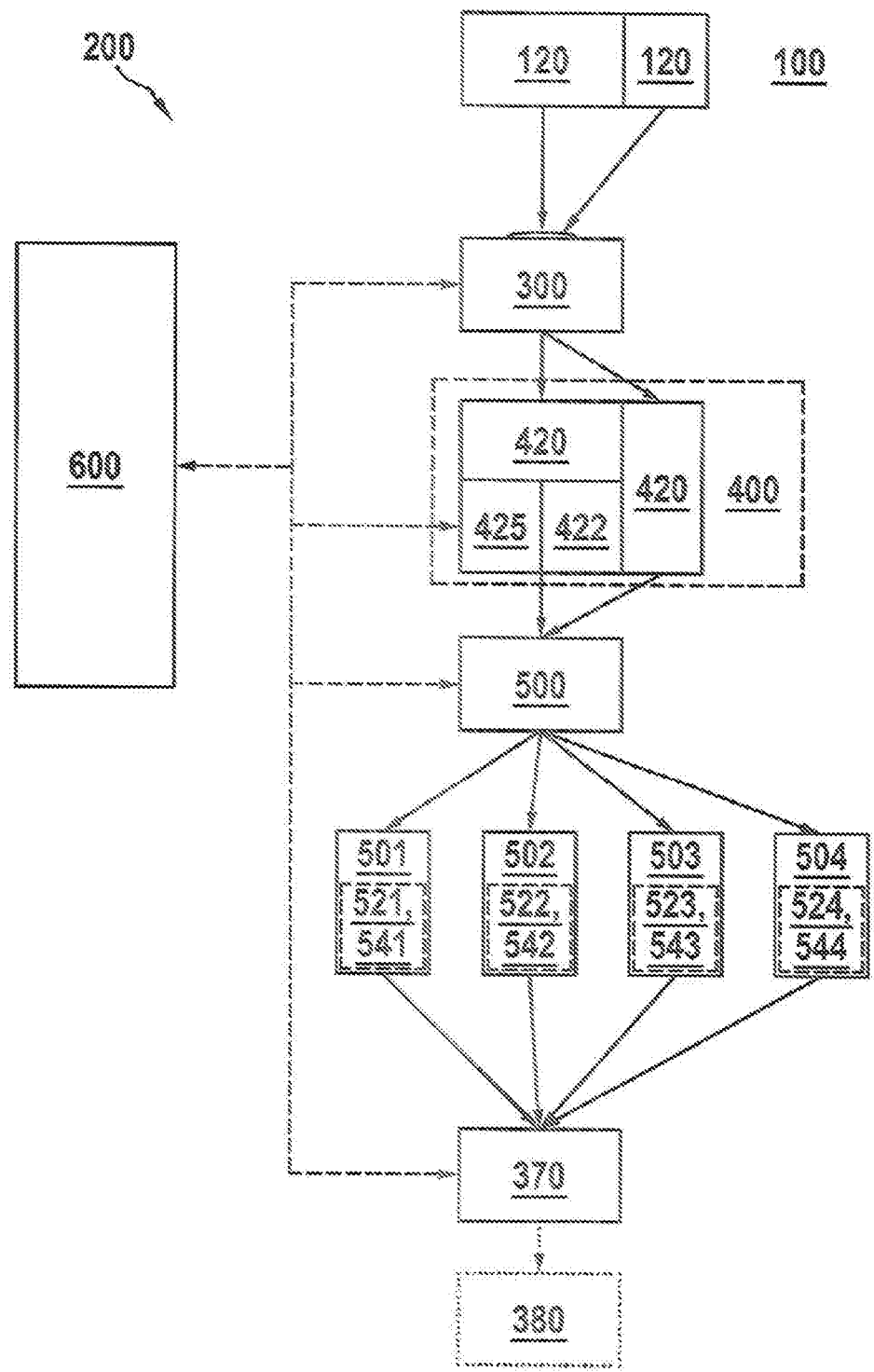
FIG. 1 illustrates schematically a system in accordance with one embodiment of the disclosure.

FIG. 1 illustrates schematically a system 200 in accordance with one embodiment of the disclosure. In this case, an object 120 that is located in a real surrounding area 100 is detected by the sensor 300. The sensor 300 may comprise one or multiple individual sensors, the sensor 300 may also comprise a subsystem that combines the data of multiple sensors and/or multiple sensor types (for example camera and radar) and provides said data as a combined representation to the system. The object 120 that is detected by means of the sensor is guided to a control device 250 that is used so as to determine a control signal 370. The control signal 370 controls a control system 380 for a vehicle 110 (not illustrated). The control device 250 comprises a storage device 400. The object 120 that is detected by means of the sensor is stored in this storage device 400 as an object representation 420, by way of example in the form of a geometric description or as an attributed object. In at least some cases, it may be that the object 120 that is detected by means of the sensor is a "ghost", in other words does not exist in the real world but is stored in the storage device 400 as an object representation 420. In many cases, a plurality of objects 120 is detected by the sensor 300 and is stored as a plurality of object representations 420 in the storage device 400. The object representation 420 may be stored as a verified object representation 425 or a non-verified object representation 422. In the case of a verified object representation 425, the object 120 is detected at least one more time by the sensor 300 or by another sensor and/or by another sensor type.

A planning module 500 uses the object representation 420 or the plurality of object representations 420 in order to determine therefrom—using further information, for example from a navigation system—a first trajectory 501 and a first probability of collision 521, where applicable also a first maximum deceleration 541, of the first trajectory 501 for the vehicle 110. The planning module 500 may also determine further trajectories 502, 503, 504 in dependence upon the value of the first probability of collision 521. The further trajectories 502, 503, 504 may be determined for example at the same time as the first trajectory or only after checking the probabilities of collision and/or in accordance with applying the above-mentioned rules. The probabilities of collision 522, 523, 524 corresponding to each of the trajectories 502, 503, 504 are determined. The maximum decelerations 542, 543, 544 corresponding to at least some of the trajectories 502, 503, 504 are determined.

Furthermore, the system 200 comprises a monitoring module 600 that is configured so as to perform one of the following actions if the first probability of collision 521 exceeds a predefined probability of collision 530: determine by means of the planning module 500 in reaction to the object representation 420 a further trajectory 502, 503, 504 having a further probability of collision 522, 523, 524 and a maximum deceleration 542, 543, 544 of the further trajectory 502, 503, 504, or check the object representation 420 of the object 120 by means of the sensor 300 with the result that the object representation 420 either disappears from the storage device 400 or is converted from a non-verified object representation 422 into a verified object representation 425. The control signal 370 is determined by means of the selection of one of the trajectories 501, 502, 503, 504. This may be used for example by a control system 380 (illustrated as dots) in order to control the vehicle 110.

Figure 2:
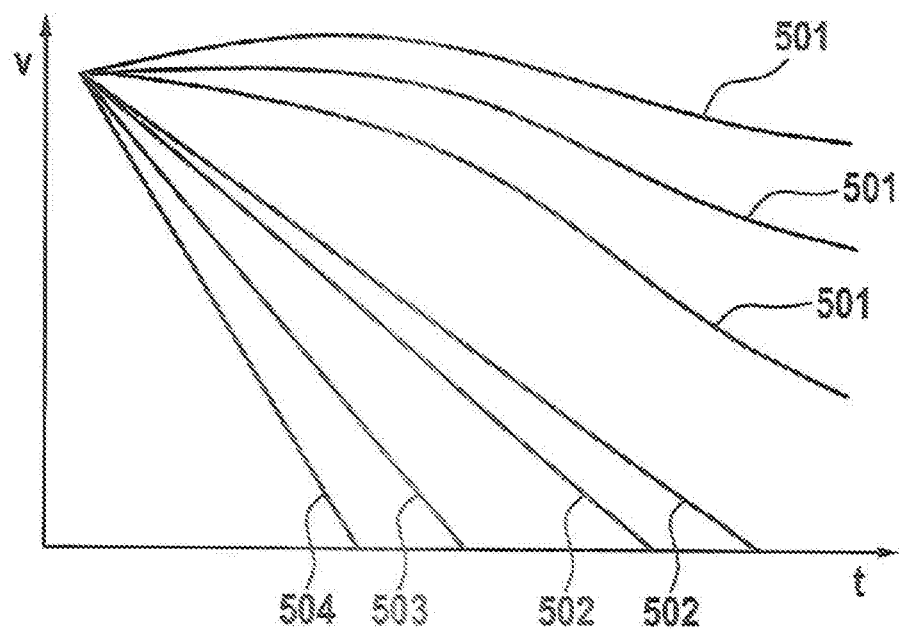
FIG. 2 illustrates schematically an overview of trajectories that have been determined in accordance with one embodiment of the disclosure.

FIG. 2 illustrates schematically an overview of trajectories 501, 502, 503, 504 that have been determined in accordance with one embodiment of the disclosure. In this case, the speed v that is to be controlled is plotted over the time t using 501, 502, 503, 504. In this case, it is clearly apparent that the first trajectories 501 (of which a plurality is plotted as an example), permit an acceleration and a deceleration. If one of the trajectories 501 would potentially lead to a collision, in other words if the first probability of collision 521 exceeds a predefined probability of collision 530 then second trajectories 502 are determined. If the probability of collision 522 of said trajectories is judged as unacceptable by the monitoring module 600, then third trajectories 503 are determined; the third trajectories 503 in this case only use the verified object representation 425 of the object 120. If the probability of collision 523 of the third trajectories 503 is judged as unacceptable, then fourth trajectories 504 and the maximum braking decelerations 543, 544 are determined. If the probabilities of collision 523, 524 of the third and the fourth trajectories 503, 504 are approximately identical, then the trajectory having the lower maximum braking deceleration 543, 544 (in other words the trajectory having the lower negative incline) is selected. This increases the safety and comfort of the vehicle because as a consequence as much as possible sudden emergency braking procedures become considerably less frequent.

Figure 3:
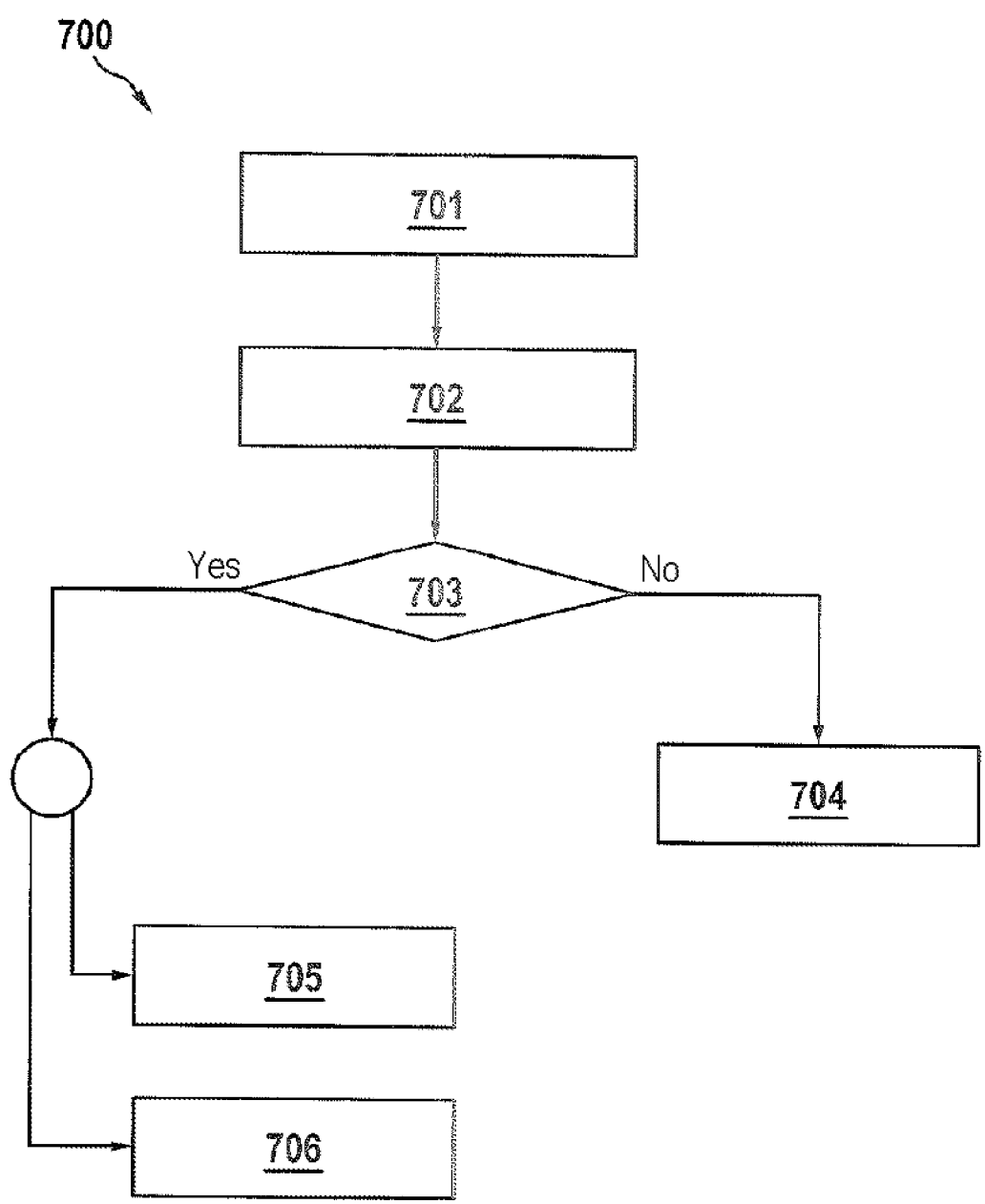
FIG. 3 illustrates a method in accordance with one embodiment of the disclosure.

FIG. 3 illustrates a method 700 in accordance with one embodiment of the disclosure. The method is executed on a system 200 for a vehicle 110 which drives in an at least in part automated manner. The system 200 may be a part of a processor unit. The method is used to determine a control signal 370 for a control system 380. In one step 701, an object 120 is to detected in a surrounding area 100 by means of a sensor 300 (cf. FIG. 1) and is stored in a storage device 400 as an object representation 420. In one step 702, a first trajectory P1 501 and a first probability of collision 521 of the first trajectory 501 for the vehicle 110 is determined by means of a planning module 500 in reaction to the object representation 420. In one step 703, a check is performed as to whether the first probability of collision P1 521 exceeds a predefined probability of collision P 530. If this is not the case, in one step 704, the first trajectory 501 is selected. If the predefined probability of collision P 530 is exceeded, then one of the following actions is performed by the monitoring module 600 (cf. FIG. 1): in one step 705, a further trajectory 502, 503, 504 having a further probability of collision 522, 523, 524 and a maximum deceleration 542, 543, 544 of the further trajectory 502, 503, 504 is determined by means of the planning module 500 in reaction to the object representation 420. Or in one step 706, the object representation 420 of the object 120 is checked by means of the sensor 300.

What is claimed is:

1. A system for a vehicle, which is at least in-part automated, the system comprising:
    a control system configured to operate the vehicle based on a control signal;
    at least one sensor configured to detect an object in a surrounding area of the vehicle at a first time and to store a corresponding object representation; and
    a processor operably connected to the at least one sensor and the control system, the processor configured to:
        determine, based on the stored object representation, (i) a first trajectory and (ii) a first probability of collision of the first trajectory for the vehicle;
        in response to the first probability of collision exceeding a predefined probability of collision, at least one of:
            determine, based on the stored object representation, (i) a second trajectory, (ii) a second probability of collision of the second trajectory for the vehicle, and (iii) a maximum deceleration required by the vehicle to achieve of the second trajectory; and
            verify the stored object representation of the object using the at least one sensor; and
        select a selected trajectory, wherein the control signal is derived from the selected trajectory.

2. The system according to claim 1, wherein the at least one sensor includes at least one of a camera, a plurality of cameras, a radar sensor, a LiDAR sensor, and an ultrasonic sensor.

3. The system according to claim 1, wherein, to verify the stored object representation, the processor is further configured to at least one of:
    check whether the object is detected again in the surrounding area of the vehicle at a second time; and
    check whether the object is detected in the surrounding area of the vehicle by at least two sensors of the at least one sensor.

4. The system according to claim 1, the processor being further configured to:
    select the second trajectory as the selected trajectory in response to the second probability of collision of the second trajectory being judged as acceptable; and
    in response to the second trajectory being judged as unacceptable:
        determine, based on the verified stored object representation, (i) a third trajectory and (ii) a third probability of collision of the third trajectory for the vehicle;
        select the third trajectory as the selected trajectory in response to the third probability of collision of the third trajectory being judged as acceptable; and
    in response to the third trajectory being judged as unacceptable:
        determine (i) a fourth trajectory and (ii) a fourth probability of collision of the fourth trajectory;
        select one of the third trajectory and the fourth trajectory having the lower probability of collision from one of the third probability of collision and the fourth probability of collision; and
        select one of the third trajectory and the fourth trajectory having the lowest required braking deceleration of the vehicle in response to the third probability of collision and the fourth probability of collision being within a threshold difference from one another.

5. A vehicle, which is at least in-part automated, the vehicle comprising:
    a control system configured to operate the vehicle based on a control signal;
    at least one sensor configured to detect an object in a surrounding area of the vehicle and to store a corresponding object representation; and
    a processor operably connected to the at least one sensor and the control system, the processor configured to:
    determine, based on the stored object representation, (i) a first trajectory and (ii) a first probability of collision of the first trajectory for the vehicle;
    in response to the first probability of collision exceeding a predefined probability of collision, at least one of:
        determine, based on the stored object representation, (i) a second trajectory, (ii) a second probability of collision of the second trajectory for the vehicle, and (iii) a maximum deceleration required by the vehicle to achieve the second trajectory; and
        verify the stored object representation of the object using the at least one sensor; and
    select a selected trajectory, wherein the control signal is derived from the selected trajectory.

6. A method for for operating a vehicle that is at least in-part-automated, the method comprising:
    detecting, with at least one sensor, an object in a surrounding area of the vehicle;

storing a corresponding object representation based on the detected object;

determining, with a processor, based on the stored object representation, (i) a first trajectory and (ii) a first probability of collision of the first trajectory for the vehicle;

performing at least one of, in response to the first probability of collision exceeding a predefined probability of collision:

determining, with the processor, based on the stored object representation, (i) a second trajectory, (ii) a second probability of collision of the second trajectory for the vehicle, and (iii) a second maximum deceleration required by the vehicle to achieve of the second trajectory; and verifying, with the processor, checking the stored object representation of the object using the at least one sensor;

selecting, with the processor, a selected trajectory; and operating, with a control system, the vehicle based on a control signal that is derived from the selected trajectory.

7. The method according to claim 6, further comprising:
selecting a second trajectory as the selected trajectory in response to the second probability of collision of the second trajectory being judged as acceptable.

8. The method according to claim 7, further comprising, in response to the second trajectory being judged as unacceptable:

determining, based on the verified stored object representation, (i) a third trajectory, (ii) a third probability of collision of the third trajectory for the vehicle, and (iii) a third maximum deceleration required by the vehicle to achieve the third trajectory;

selecting the a third trajectory as the selected trajectory in response to the third probability of collision of the third trajectory being judged as acceptable.

9. The method according to claim 8, further comprising, in response to the third trajectory being judged as unacceptable:

determining (i) a fourth trajectory, (ii) a fourth probability of collision and (iii) a fourth maximum deceleration required by the vehicle to achieve the fourth trajectory; and selecting one of the third trajectory and the fourth trajectory having the lower probability of collision from the third probability of collision and the fourth probability of collision.

10. The method according to claim 9, further comprising:
selecting one of the third trajectory and the fourth trajectory having the lowest required braking deceleration of the vehicle in response to the third probability of collision and the fourth probability of collision being within a threshold difference from one another.

11. The method according to claim 6, wherein the at least one sensor includes at least one of a camera, a plurality of cameras, a radar sensor, a LiDAR sensor, and an ultrasonic sensor.

12. The method according to claim 6, the verifying the stored object representation further comprising at least one of:

checking whether the object is detected again in the surrounding area of the vehicle at a second time; and checking whether the object is detected in the surrounding area of the vehicle by at least two sensors of the at least one sensor.

13. The method according to claim 6, wherein a program element, when executed on a processing unit, is configured to implement the method.

14. The method according to claim 13, wherein the program element is stored in a computer-readable medium.

* * * * *

UNITED STATES PATENT AND TRADEMARK OFFICE
CERTIFICATE OF CORRECTION

| | |
|---|---|
| PATENT NO. | : 11,292,463 B2 |
| APPLICATION NO. | : 16/566662 |
| DATED | : April 5, 2022 |
| INVENTOR(S) | : Hardy et al. |

It is certified that error appears in the above-identified patent and that said Letters Patent is hereby corrected as shown below:

In the Claims

In Claim 6, at Column 8, Line 64: "A method for for operating" should read --A method for operating--.

In Claim 7, at Column 9, Line 23: "selecting a second trajectory" should read --selecting the second trajectory--.

In Claim 8, at Column 9, Line 34: "selecting the a third trajectory" should read --"selecting the third trajectory--.

In Claim 9, at Column 10, Line 5: "collision and (iii)" should read --collision, and (iii)--.

Signed and Sealed this
Sixth Day of September, 2022

*Katherine Kelly Vidal*

Katherine Kelly Vidal
*Director of the United States Patent and Trademark Office*